United States Patent
Yi et al.

(10) Patent No.: US 12,482,605 B2
(45) Date of Patent: Nov. 25, 2025

(54) MULTILAYERED CAPACITOR INCLUDING EXTERNAL ELECTRODE HAVING ALLOY PORTION AND DIFFUSION PORTION, AND METHOD FOR MANUFACTURING THE SAME

(71) Applicant: SAMSUNG ELECTRO-MECHANICS CO., LTD., Suwon-si (KR)

(72) Inventors: Jaeseok Yi, Suwon-si (KR); Seonho Park, Suwon-si (KR); Do Yeon Kim, Suwon-si (KR); Sunghyung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 121 days.

(21) Appl. No.: 18/502,257

(22) Filed: Nov. 6, 2023

(65) Prior Publication Data
US 2024/0274364 A1  Aug. 15, 2024

(30) Foreign Application Priority Data
Feb. 13, 2023  (KR) .................. 10-2023-0018666

(51) Int. Cl.
*H01G 4/232* (2006.01)
*H01G 4/30* (2006.01)
(Continued)

(52) U.S. Cl.
CPC ............. *H01G 4/2325* (2013.01); *H01G 4/30* (2013.01); *H01G 4/0085* (2013.01); *H01G 4/012* (2013.01); *H01G 4/12* (2013.01)

(58) Field of Classification Search
None
See application file for complete search history.

(56) References Cited

U.S. PATENT DOCUMENTS

| 2012/0007709 A1* | 1/2012 | Taniguchi | H01G 4/12 361/321.1 |
| 2014/0375173 A1* | 12/2014 | Hamanaka | H10N 30/877 336/200 |

(Continued)

FOREIGN PATENT DOCUMENTS

| CN | 112447396 A | 3/2021 |
| CN | 114783770 A | 7/2022 |

(Continued)

OTHER PUBLICATIONS

Extended European Search Report dated Mar. 17, 2025, issued in corresponding European Patent Application No. 23215884.0.

*Primary Examiner* — Eric W Thomas
(74) *Attorney, Agent, or Firm* — Morgan Lewis & Bockius LLP

(57) ABSTRACT

A multilayered capacitor includes a capacitor body including a dielectric layer and an internal electrode, and an external electrode outside the capacitor body, in which the external electrode includes a first layer disposed outside the capacitor body and including a first conductive metal, a second conductive metal, and an alloy thereof, and the first layer includes an inner layer including an alloy portion disposed at a portion meeting the dielectric layer and including the alloy, and a diffusion portion disposed at a portion meeting the internal electrode and including the first conductive metal, a third conductive metal included in the internal electrode, an alloy thereof, or a combination thereof.

18 Claims, 5 Drawing Sheets

(51) Int. Cl.
*H01G 4/008* (2006.01)
*H01G 4/012* (2006.01)
*H01G 4/12* (2006.01)

(56) References Cited

U.S. PATENT DOCUMENTS

| | | |
|---|---|---|
| 2016/0087189 A1* | 3/2016 | Lee .................... H01G 4/30 29/25.35 |
| 2016/0268046 A1 | 9/2016 | Nishisaka et al. |
| 2018/0166215 A1 | 6/2018 | Hamanaka et al. |
| 2022/0238278 A1 | 7/2022 | Nishiura et al. |

FOREIGN PATENT DOCUMENTS

| | | | |
|---|---|---|---|
| JP | 2001-338829 A | 12/2001 | |
| JP | 6679964 B2 | 4/2020 | |

* cited by examiner

MULTILAYERED CAPACITOR INCLUDING EXTERNAL ELECTRODE HAVING ALLOY PORTION AND DIFFUSION PORTION, AND METHOD FOR MANUFACTURING THE SAME

CROSS-REFERENCE TO RELATED APPLICATION

This application claims priority to and the benefit of Korean Patent Application No. 10-2023-0018666 filed in the Korean Intellectual Property Office on Feb. 13, 2023, the entire contents of which are incorporated herein by reference.

TECHNICAL FIELD

This disclosure relates to a multilayered capacitor and a method for manufacturing the same.

BACKGROUND

Multilayered ceramic capacitors (MLCC) are being increasingly used not only in IT industries such as computers, communications, etc. but also in large-scale electronic equipment industries such as in automobiles, factories, etc. Currently, regardless of IT and automotive electrical devices, the multilayered ceramic capacitors (MLCC) are rapidly becoming thinner in order to secure high capacity, and it is important to prevent reliability deterioration resulting therefrom.

The multilayered capacitors consist of three parts: a dielectric layer, an internal electrode, and an external electrode. Among them, the dielectric layer and the internal electrode are stacked into a capacitor body, and then the external electrode is electrically connected thereto by wrapping exposed parts at both ends of the capacitor body to couple the internal electrodes in parallel.

In order to secure the electrical connectivity between the external and internal electrodes, the external electrode is formed after coating a metal powder-based paste on both ends of the capacitor body and sintering it at a high temperature. In this process, in order to secure an adhesion force between the metal and the capacitor body, glass is used therewith together.

Subsequently, the external electrode is completed by forming a plating layer, wherein the glass component is eroded by a plating solution, and hydrogen generated during the plating penetrates into the capacitor body, resulting in the reliability deterioration.

The information disclosed in the Background section above is to aid in the understanding of the background of the present disclosure, and should not be taken as acknowledgement that this information forms any part of prior art.

SUMMARY

One aspect of the present disclosure may be directed to a multilayered capacitor capable of maintaining an adhesion force between an external electrode and a capacitor body as well as preventing erosion of a glass component by a plating solution during formation of the external electrode and improving initial reliability deterioration problem by preventing hydrogen generated during plating of the external electrode from penetrating into the capacitor body.

A multilayered capacitor according to one aspect of the present disclosure includes a capacitor body including a dielectric layer and an internal electrode, and an external electrode outside the capacitor body, in which the external electrode includes a first layer disposed outside the capacitor body and including a first conductive metal, a second conductive metal, and an alloy thereof, and the first layer includes an inner layer including an alloy portion at a portion meeting the dielectric layer and a diffusion portion at a portion meeting the internal electrode.

The alloy of the first conductive metal and the second conductive metal may be a eutectic alloy.

The alloy portion may include an alloy of the first conductive metal and the second conductive metal.

The diffusion portion may include the first conductive metal, a third conductive metal included in the internal electrode, an alloy thereof, or a combination thereof.

The first layer may not include a glass component.

The first conductive metal may be copper (Cu).

The second conductive metal may be silver (Ag).

The third conductive metal may be nickel (Ni).

The eutectic alloy may be a mixture of the first conductive metal and the second conductive metal in a lamellar structure, a rod-like structure, a globular structure, or an acicular structure.

The alloy portion may further include an oxide of the second conductive metal.

The oxide of the second conductive metal may be silver oxide ($AgO_x$).

The oxide of the second conductive metal in the alloy portion may be mainly disposed in a portion in contact with the dielectric layer.

The alloy portion and the diffusion portion may be alternately disposed along a stacking direction of the dielectric layer and the internal electrode.

The alloy portion may extend along a width direction of the dielectric layer.

The diffusion portion may extend along a width direction of the internal electrode.

The alloy portion may have a plurality of first portions that contact the dielectric layer and extend along a width direction of the dielectric layer, and a second portion disposed outside the plurality of first portions and extending along a stacking direction of the dielectric layer to connect the plurality of first portions.

The diffusion portion may be disposed between the plurality of first portions of the alloy portion.

The first layer may include an outer layer disposed outside the inner layer and including the first conductive metal and the second conductive metal.

The outer layer may include the first conductive metal as a main component, and the second conductive metal may be dispersed in the first conductive metal.

The external electrode may further include a third layer disposed outside the first layer and including a plated metal.

The outer layer may be in contact with the third layer.

The external electrode may be disposed between the first layer and the third layer and may further include a second layer including a resin and a conductive metal.

A method of manufacturing a multilayered capacitor according to another aspect includes manufacturing a capacitor body including a dielectric layer and an internal electrode, and forming an external electrode outside the capacitor body, in which the forming of the external electrode includes forming a first layer by sintering a paste for forming a first layer including a first conductive metal and a second conductive metal at a temperature higher than or equal to a eutectic temperature of the first conductive metal and the second conductive metal.

The first conductive metal may be copper (Cu), the second conductive metal may be silver (Ag), and the eutectic temperature may be about 760° C. to about 800° C.

The paste for forming the first layer may include about 10 parts by weight to about 100 parts by weight of the second conductive metal based on 100 parts by weight of the first conductive metal.

The sintering may be performed under an air atmosphere and atmospheric pressure.

In the forming of the first layer, in the sintering of the paste for forming the first layer at a temperature higher than or equal to the eutectic temperature, the first conductive metal, the second conductive metal, a eutectic alloy thereof, or a combination thereof is liquefied, wets a surface of the capacitor body, and then is cooled along with an interface oxidation reaction to form the first layer.

The forming of the external electrode may further include forming the second layer by coating a paste for forming the second layer including a resin, conductive metal powder, and an organic solvent.

The forming of the external electrode may further include forming the third layer on the first layer or the second layer in a plating method.

The multilayered capacitor according to one aspect of the present disclosure may maintain an adhesion force between external electrode and capacitor body as well as prevent the erosion of glass components by a plating solution during the formation of the external electrode and improve initial reliability deterioration by preventing hydrogen generated during the plating of the external electrode from penetrating into the capacitor body.

The apparatus and method of the present disclosure have other features and advantages which will be apparent from or are set forth in more detail in the accompanying drawings, which are incorporated herein, and the following Detailed Description, which together serve to explain certain principles of the present disclosure.

Figure 1:
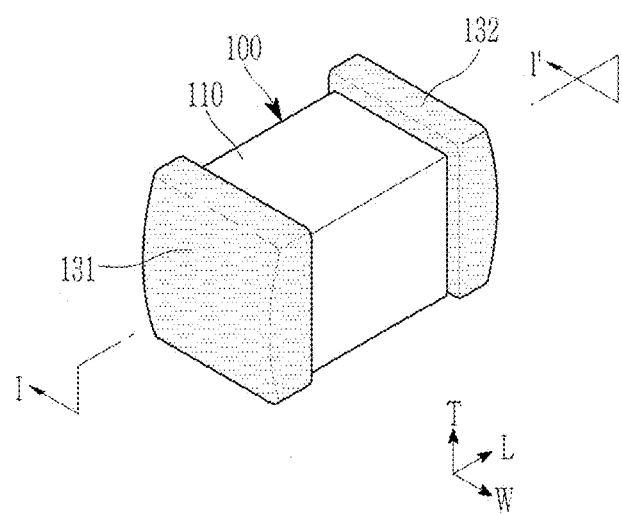
FIG. 1 is a perspective view illustrating a multilayered capacitor according to an embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE EMBODIMENTS

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
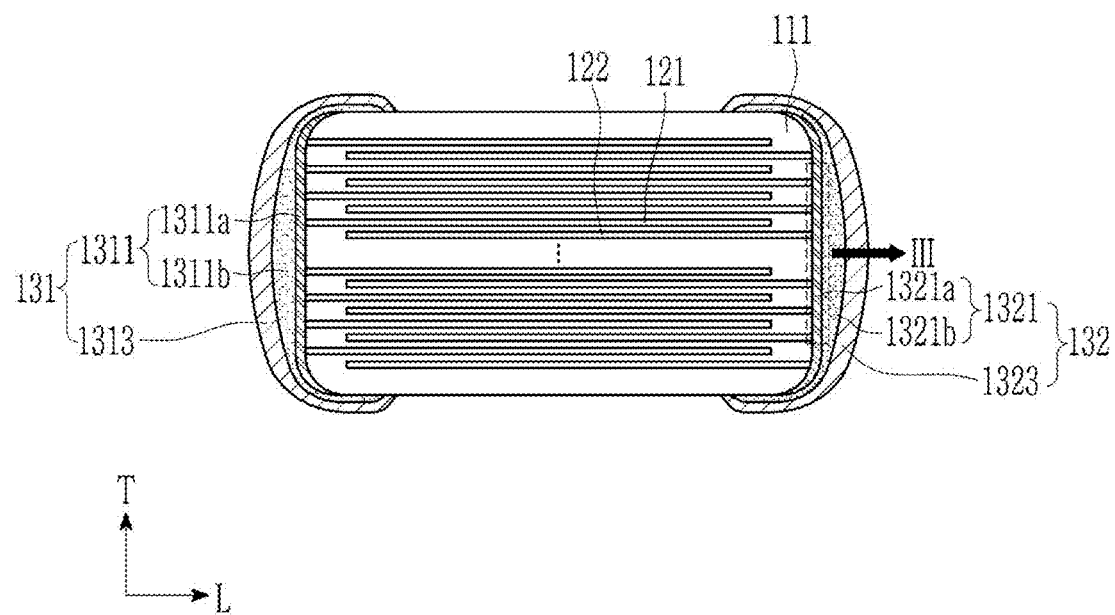
FIG. 2 is a cross-sectional view of the multilayered capacitor taken along line I-I' of FIG. 1.
Figure 3:
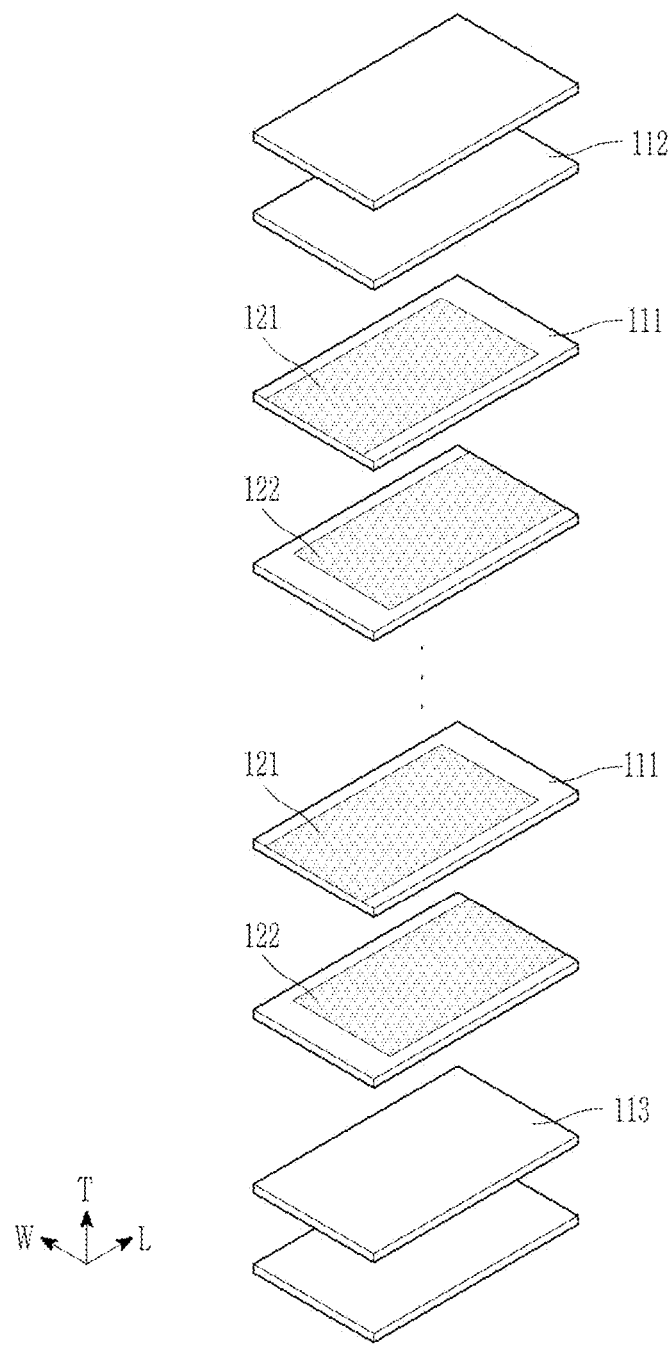
FIG. 3 is an exploded perspective view illustrating a stacked structure of internal electrodes in the capacitor body of FIG. 1.

FIG. 1 is a perspective view illustrating a multilayered capacitor 100 according to an embodiment of the present disclosure, FIG. 2 is a cross-sectional view of the multilayered capacitor 100 taken along line I-I' of FIG. 1, and FIG. 3 is an exploded perspective view illustrating a stacked structure of internal electrodes in a capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces.

For example, the first surface, which is a lower surface, may be a surface facing a mounting direction. In addition, the first to sixth surfaces may be flat, but the present embodiment is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. In this case, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$. In addition, auxiliary components such as a Mn compound, a Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as nickel (Ni), copper (Cu), silver (Ag), palladium (Pd), or gold (Au), or an alloy thereof, for example nickel (Ni).

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the first and second surfaces of the capacitor body 110 and the third and fourth surfaces thereof meet.

The first and the second band portions may extend from the first and second connection portions to portions of the first and second surfaces of the capacitor body 110, respectively. The first and the second band portions may respectively further extend from the first and second connection portions to the portions of the fifth and sixth surfaces of the capacitor body 110. The first and the second band portions may serve to improve an adhesion strength of the first and second external electrodes 131 and 132.

Figure 4:
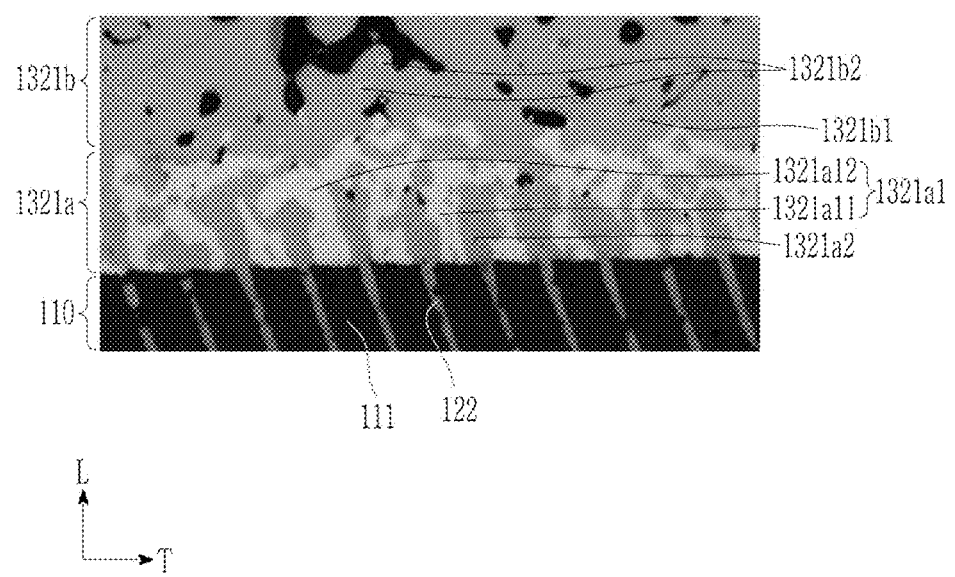
FIG. 4 is a scanning electron microscope (SEM) photograph of an enlarged region III of FIG. 2.

FIG. 4 is an enlarged cross-sectional view of the region III of FIG. 2 to schematically show a bonding boundary region between the second external electrode 132 and the capacitor body 110. FIG. 4 shows the second external electrode 132 alone, but the first external electrode 131 also has similar characteristics to those of the second external electrode 132 shown in FIG. 4. Hereinafter, referring to FIG. 4, the first and second external electrodes 131 and 132 of the present example embodiment are illustrated in detail.

The first and second external electrodes 131 and 132 include first layers 1311 and 1321, and the first layer 1321 of the second external electrode 132 includes a first conductive metal 1321b1, a second conductive metal 1321b2, and an alloy thereof. In one embodiment, the structure of the first layer 1311 of the first external electrode 131 may be similar to that of the first layer 1321 of the second external electrode 132. The first layers 1311 and 1321 of the first and second external electrodes 131 and 132 may be disposed in contact with outer surfaces (third and fourth surfaces) of the capacitor body 110.

The first and second external electrodes 131 and 132 may be composed of a single electrode layer or formed by stacking a plurality of electrode layers. For example, when the first and second external electrodes 131 and 132 are composed of the plurality of electrode layers, the first and second external electrodes 131 and 132 may include first layers 1311 and 1321 contacting the capacitor body 110 and third layers 1313 and 1323 disposed to cover the first layers 1311 and 1321.

For example, the first layers 1311 and 1321 may include no glass component, for example, only include a first conductive metal 1321b1, a second conductive metal 1321b2, and an alloy thereof.

The glass component is used to secure an adhesion force between the metal components of the first and second external electrodes 131 and 132 and the capacitor body 110. For example, the glass component may be one or more selected from a silicon oxide, a boron oxide, an aluminum oxide, a transition metal oxide, an alkali metal oxide, and an alkali earth metal oxide. Herein, the transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

However, after forming the first layers 1311 and 1321, when the third layers 1313 and 1323 are formed in a plating method, the glass component may be eroded by a plating solution. In addition, hydrogen generated during the plating may penetrate into the capacitor body 110, resultantly causing reliability deterioration.

On the other hand, the present embodiment includes no glass component in the first layers 1311 and 1321 and may prevent the glass component from being eroded by a plating solution and penetrating into the capacitor body 110. Because the first layers 1311 and 1321 include no glass component, it thus may deteriorate the adhesion force between the first and second external electrodes 131 and 132 of the capacitor body 110. However, the first layers 1311 and 1321 include an alloy portion 1321a1 including an alloy of the first conductive metal 1321b1 and the second conductive metal 1321b2, which thus may prevent the deterioration of the adhesion force between the capacitor body 110 and the first and second external electrodes 131 and 132.

In addition, the first layers 1311 and 1321 may include inner layers 1311a and 1321a including the alloy portion 1321a1, and outer layers 1311b and 1321b disposed outside the inner layers 1311a and 1321a and including the first conductive metal 1321b1 and the second conductive metal 1321b2. As such, the first layers 1311 and 1321 have a multi-layer structure with multiple interfaces including the inner layers 1311a and 1321a connected to the first and second internal electrodes 121 and 122, respectively, of the capacitor body 110 and the outer layers 1311b and 1321b disposed outside the inner layers 1311a and 1321a and connected to the third layers 1313 and 1323, respectively, which are plating layers, and thereby, may delay a penetration rate of hydrogen generated during plating of the external electrode into the capacitor body 110 to reduce a total amount of the hydrogen, thereby improving the initial reliability deterioration problem.

For example, the inner layers 1311a and 1321a of the first layers 1311 and 1321 includes an alloy portion 1321a1 disposed at a portion meeting the dielectric layer 111 and a diffusion portion 1321a2 disposed at a portion meeting the first and second internal electrodes 121 and 122.

The alloy portion 1321a1 may be disposed at an end of the dielectric layer 111 in the longitudinal direction (L-axis direction). The alloy portion 1321a1 may extend along the width direction (W-axis direction) of the dielectric layer 111.

The alloy portion 1321a1 may include an alloy of the first conductive metal 1321b1 and the second conductive metal 1321b2.

For example, the first conductive metal 1321b1 may be copper (Cu), palladium (Pd), gold (Au), platinum (Pt), tin (Sn), tungsten (W), titanium (Ti), lead (Pb), an alloy thereof, or a combination thereof, or may be copper (Cu).

The second conductive metal 1321b2 is not particularly limited as long as it can form an alloy with the first conductive metal 1321b1, and may include, for example, silver (Ag), palladium (Pd), gold (Au), platinum (Pt), tin (Sn), tungsten (W), titanium (Ti), lead (Pb), an alloy thereof, or a combination thereof, or may be silver (Ag).

For example, the alloy of the first conductive metal 1321b1 and the second conductive metal 1321b2 may be a eutectic alloy. The eutectic alloy metal is a heterogeneous alloy in which metals are not dissolved but mixed in a small crystalline state of pure metals, solid solutions, and intermetallic compounds and also, called to be a eutectic alloy. The eutectic alloy may include the first conductive metal 1321b1 and the second conductive metal 1321b2, which are mixed in a lamellar structure, a rod-like structure, a globular structure, or an acicular structure.

The alloy portion 1321a1 may further include an oxide of the second conductive metal 1321b2. For example, when the second conductive metal 1321b2 is silver (Ag), an oxide of the second conductive metal 1321b2 may be a silver oxide ($AgO_x$). The alloy portion 1321a1 further includes the oxide of the second conductive metal 1321b2 and thus may further improve the adhesion force between the capacitor body 110 and the first and second external electrodes 131 and 132, even though the first layers 1311 and 1321 include no glass component.

For example, in the alloy portion 1321a1, the oxide of the second conductive metal 1321b2 may be mainly disposed where to contact the dielectric layer 111 or dispersed throughout the alloy portion 1321a1. When the oxide of the second conductive metal 1321b2 is disposed where to contact the dielectric layer 111, the adhesion force between the capacitor body 110 and the first and second external electrodes 131 and 132 may be further improved.

The oxide of the second conductive metal 1321b2 may be produced in a process of forming the eutectic alloy of the first conductive metal 1321b1 and the second conductive metal 1321b2 during formation of the first layers 1311 and 1321. In a process of sintering the paste for forming a first layer including the first conductive metal 1321b1 and the second conductive metal 1321b2 at the eutectic temperature of the first conductive metal 1321b1 and the second conductive metal 1321b2 or higher, the first conductive metal 1321b1, the second conductive metal 1321b2, a eutectic alloy thereof, or a combination thereof is liquefied to wet the surface of the capacitor body 110 and then cooled with an interface oxidation reaction, forming the first layers 1311 and 1321. The oxide of the second conductive metal 1321b2 may be mainly produced where to contact the dielectric layer 111 by the interface oxidation reaction.

The diffusion portion 1321a2 may be disposed at ends of the first and second internal electrodes 121 and 122 in a longitudinal direction (L-axis direction). The diffusion portion 1321a2 may extend along a width direction (W-axis direction) of the first and second internal electrodes 121 and 122.

The diffusion portion 1321a2 may include the first conductive metal 1321b1, a third conductive metal that the first and second internal electrodes 121 and 122 include, an alloy thereof, or a combination thereof. For example, when the first conductive metal 1321b1 of the first layers 1311 and 1321 includes copper (Cu), and the first and second internal electrodes 121 and 122 include nickel (Ni), the diffusion portion 1321a2 may include copper (Cu), nickel (Ni), an alloy of copper (Cu) and nickel (Ni), or a combination thereof. The diffusion portion 1321a2 includes the alloy of the first conductive metal 1321b1 included in the first layers 1311 and 1321 and the third conductive metal of the first and second internal electrodes 121 and 122, which may form a denser structure and thus further improve the adhesion force between the first layers 1311 and 1321 and the first and second internal electrodes 121 and 122 and thereby, much further prevent the penetration of hydrogen.

For example, the capacitor body 110 may be formed by stacking a plurality of the dielectric layers 111. Since the alloy portion 1321a1 may be disposed at each end of the plurality of the dielectric layer 111 in the longitudinal direction (L-axis direction), the alloy portion 1321a1 may have a plurality of first portions 1321a11 respectively contacting the plurality of dielectric layers 111. The first portions 1321a11 may extend along the width direction (W-axis direction) of the dielectric layers 111 respectively in contact therewith.

In addition, the alloy portion 1321a1 may have second portions 1321a12 disposed outside the plurality of the first portions 1321a11 in the longitudinal direction (L-axis direction).

The second portions 1321a12 may extend in the longitudinal direction (L-axis direction) and the thickness direction (T-axis direction) and are substantially connected to form one layer, thereby connecting the plurality of first portions 1321a11 to each other. However, on any one cross-section perpendicular to the width direction (W-axis direction) of the multilayered capacitor 100, for example, the cross-section perpendicular to the width direction (W-axis direction) at the center of the multilayered capacitor 100, the second portions 1321a12 may include a disconnection portion, an island portion, a pore portion, or a combination thereof.

The second portions 1321a12 are in contact with the outer layers 1311b and 1321b. However, the second portions 1321a12 may have an unclear boundary with the outer layers 1311b and 1321b. Some of the alloy of the second portions 1321a12 may be present inside the outer layers 1311b and 1321b, while the first conductive metal 1321b1 included in the outer layers 1311b and 1321b is present inside the second portions 1321a12, and furthermore, may be connected to the first portions 1321a11 or the diffusion portion 1321a2.

The diffusion portion 1321a2 may be disposed among the plurality of first portions 1321a11 of the alloy portion 1321a1. Accordingly, the alloy portion 1321a1 and the diffusion portion 1321a2 may be alternately disposed along the stacking direction (T-axis direction) of the dielectric layer 111 and the first and second internal electrodes 121 and 122. In other words, as the dielectric layer 111 and the first and second internal electrodes 121 and 122 are alternatively stacked, the alloy portion 1321a1 at the end of the dielectric layer 111 in the longitudinal direction (L-axis direction) may be alternately disposed with the diffusion portion 1321a2 at the end of the first and second internal electrodes 121 and 122 in the longitudinal direction (L-axis direction).

In addition, the second portion 1321a12 of the alloy portion 1321a1 may be positioned outside the diffusion portion 1321a2. Accordingly, the second portion 1321a12 of the alloy portion 1321a1 may prevent a direct contact of the diffusion portion 1321a2 with the outer layers 1311b and 1321b and thus further prevent the penetration of hydrogen.

The outer layers 1311b and 1321b are disposed outside the inner layers 1311a and 1321a in the longitudinal direction (L-axis direction), for example, may contact the second portions 1321a12 of the alloy portions 1321a1 of the inner layers 1311a and 1321a. However, as the outer layers 1311b and 1321b and the inner layers 1311a and 1321a are formed together by sintering the paste for forming a first layer including the first conductive metal 1321b1 and the second conductive metal 1321b2 at the eutectic temperature of the first conductive metal 1321b1 and the second conductive metal 1321b2 or higher, a boundary between outer layers 1311b and 1321b and inner layers 1311a and 1321a may be unclear.

The outer layers 1311b and 1321b include the first conductive metal 1321b1 and the second conductive metal 1321b2, for example, may include the first conductive metal 1321b1 as a main component and the second conductive metal 1321b2 dispersed in the first conductive metal 1321b1.

The inner layers 1311a and 1321a and the outer layers 1311b and 1321b of the first layers 1311 and 1321 and the alloy portion 1321a1 and the diffusion portion 1321a2 of the inner layers 1311a and 1321a may be analyzed by examining any cross-section of the multilayered capacitor 100, for example, in a perpendicular direction (L-axis direction and T-axis direction) to the width direction (T-axis direction)

with a scanning electron microscope (SEM), a scanning transmission electron microscope (STEM), or the like. For example, UHR-SEM (the scanning electron microscope) may be used under conditions of an acceleration voltage of 10 KV and an analysis magnification of 3000 times.

In addition, in the examination of the cross-section, a composition of an alloy of the alloy portion 1321a1, the first conductive metal 1321b1 of the diffusion portion 1321a2, the third conductive metal, or an alloy thereof may be measured through a component analysis by using an electron beam microanalyzer (EPMA). The component analysis may be performed at 3 positions or more, and the measurement results may be averaged to calculate the composition. When the component analysis is performed with an electron beam microanalyzer (EPMA), an energy dispersive spectroscope (EDS), or a wavelength dispersive spectroscope (WDS), as an X-ray spectrometer may be used.

In addition, an average length, an average area, or the like of the alloy portion 1321a1 and the diffusion portion 1321a2 may be measured by image-analyzing the cross-section photographs obtained from the cross-section examination with SEM or STEM. When the cross-sections of the first layers 1311 and 1321 are examined through reflection electron images of SEM, HAADF images of STEM, or the like, the alloy portion 1321a1 including the alloy may be recognized as a bright portion, and the diffusion portion 1321a2 including an alloy of the first conductive metal 1321b1 and the third conductive metal may be recognized as a slightly darker portion of the contrast. Accordingly, the average length, the average area, or the like of the alloy portion 1321a1 and the diffusion portion 1321a2 may be calculated as an area ratio of the bright portion to the entire measured visual field by binarizing the cross-section photographs and the like. In addition, the measurement may be performed in at least 5 visual fields or more and then averaged.

A ratio of an area of the alloy portion 1321a1 to a unit area of the first layers 1311 and 1321 may be 10% to 90%, for example, 20% to 40%.

Herein, in the SEM or STEM cross-section photograph, etc., the average area ratio of the alloy portions 1321a1 may be measured in a unit area of a width of about 1 µm to about 100 µm and a length of about 1 µm to about 100 µm, for example, about 10 µm×about 2 µm in the first layers 1311 and 1321. The unit area may be disposed at any position in the first layers 1311 and 1321, for example, the first and second connection portions of the first layers 1311 and 1321, the first and second band portions, and the edges therebetween. However, all the unit areas may be disposed in the first layers 1311 and 1321. The average area ratio of the alloy portion 1321a1 may be an arithmetic mean of a plurality of unit areas of the alloy portion 1321a1 in the first layers 1311 and 1321, for example, an arithmetic mean of the area ratios of the alloy portion 1321a1 which are measured from unit areas of the first and second connection portions, the first and second band portions, and the edges therebetween.

When the average area ratio of the alloy portion 1321a1 is less than about 10%, there may be an insufficient adhesion between the capacitor body 110 and the first and second external electrodes 131 and 132.

For example, on the third and fourth surfaces of the capacitor body, the diffusion portion 1321a2 of the first layers 1311 and 1321 may have an average length (average thickness) of 0 µm to about 10 µm, for example, about 3 µm to about 5 µm in the longitudinal direction (L-axis direction). When the diffusion portion 1321a2 has an average length (average thickness) of less than 0 µm in the longitudinal direction (L-axis direction), the diffusion portion 1321a2 may not well contact the first and second internal electrodes 121 and 122, increasing resistance.

In addition, the average area ratio of the diffusion portion 1321a2 to the unit area of the first layers 1311 and 1321 may be about 2% to about 30%, for example, about 5% to about 10%.

For example, on the third and fourth surfaces of the capacitor body, the average length (average thickness) of the outer layers 1311b and 1321b of the first layers 1311 and 1321 in the longitudinal direction (L-axis direction) may be about 5 µm to about 50 µm, for example, about 10 µm to about 20 µm. When the average length (average thickness) of the outer layers 1311b and 1321b in the longitudinal direction (L-axis direction) is less than 5 µm, sufficient electrode density and electrode coverage may not be secured.

In addition, the average area ratio of the outer layers 1311b and 1321b to the unit area of the first layers 1311 and 1321 may be about 50% to about 90%, for example, about 60% to about 70%.

As described above, the first and second external electrodes 131 and 132 may be formed by stacking a plurality of electrode layers, which may optionally, further include second layers (not shown) respectively disposed between the first layers 1311 and 1321 and the third layers 1313 and 1323.

The second layers may be disposed outside the first layers 1311 and 1321 and for example, formed to completely cover the first layers 1311 and 1321.

The second layers may include a base resin and a conductive metal copper (Cu), silver (Ag), nickel (Ni), or a mixture thereof.

The base resin included in the second layers is not particularly limited as long as it has bondability and impact absorption ability and may be mixed with the conductive metal powder to form a paste, and may include, for example, an epoxy resin.

The conductive metal included in the second layers is not particularly limited as long as it is a material that can be electrically connected to the first layers 1311 and 1321, and may include, for example, copper (Cu), silver (Ag), nickel (Ni), or a mixture thereof.

The second layers extend onto the first and second surfaces, respectively, of the capacitor body 110. The length of the region where the second layers extend onto the first and second surfaces of the ceramic body 110 may be longer than the length of the region where the first layers 1311 and 1321 extend onto the first and second surfaces of the capacitor body 110. That is, the second layers may be formed on the first layers 1311 and 1321, and completely cover the first layers 1311 and 1321.

The third layers 1313 and 1323 may include nickel (Ni) as a main component, and may further include copper (Cu), tin (Sn), palladium (Pd), platinum (Pt), gold (Au), silver (Ag), tungsten (W), titanium (Ti), or lead (Pb) alone or as an alloy thereof. The third layers 1313 and 1323 may improve mountability of the multilayered capacitor 100 with a board, structural reliability, external durability, heat resistance, and equivalent series resistance (ESR).

For example, the third layers 1313 and 1323 may be formed through plating. The third layers 1313 and 1323 may be formed through sputtering or electroplating (electric deposition).

A method of manufacturing a multilayered capacitor according to another example embodiment includes manufacturing a capacitor body including a dielectric layer and an internal electrode, and forming an external electrode outside the capacitor body.

First, the manufacturing of the capacitor body is described. In the manufacturing process of the capacitor body, a dielectric paste to become the dielectric layer after firing and a conductive paste to become the internal electrode after firing are prepared.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass frit as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, where an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like, for example, may be used, and a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the internal electrode on the outer surfaces of the third and fourth surfaces, thereby improving the electrical connection of the external and internal electrodes and easily forming the alloy portion.

On the outer surface of the capacitor body, a paste for forming a first layer of the external electrode may be coated and sintered to form a first layer including an inner layer including an alloy portion where to meet the dielectric layer and a diffusion portion where to meet the internal electrode and an outer layer disposed outside the inner layer.

The paste for forming the first layer may include a first conductive metal and a second conductive metal. The first conductive metal and the second conductive metal are the same as above and will not be repeatedly illustrated. In addition, the paste for forming the first layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for forming the first layer on the outer surface of the capacitor body may include various printing methods such as a dip method, or screen printing, a coating method by using a dispenser, a spray method by using a spray, and the like. The paste for forming the first layer may be coated on at least the third and fourth surfaces of the capacitor body and optionally, on a portion of the first surface, the second surface, the fifth surface, or the sixth surface where the external electrode is formed.

Subsequently, the capacitor body on which the paste for forming the first layer is coated is dried and then sintered at a temperature higher than or equal to the eutectic temperature of the first conductive metal and the second conductive metal, forming the first layer.

For example, when the first conductive metal is copper (Cu) and the second conductive metal is silver (Ag), the eutectic temperature may be about 760° C. to about 800° C. or about 779° C. to about 80° C. The eutectic temperature may a little vary depending on a powder size, a temperature increasing rate, or the like during the firing. In addition, the sintering may be performed for about 0.1 hour to about 3 hours.

The paste for forming the first layer may include the second conductive metal in an amount of about 10 parts by weight to about 100 parts by weight, for example, about 20 parts by weight to about 40 parts by weight, based on 100 parts by weight of the first conductive metal. When the content of the second conductive metal in the paste for forming the first layer is less than about 10 parts by weight, based on 100 parts by weight of the first conductive metal, there may be an insufficient adhesion force between capacitor body and first and second external electrodes, and when the content is greater than about 100 parts by weight, the first layer may be completely liquefied, separating the first layer from the capacitor body.

Without being bound to specific theory, while the paste for forming the first layer is sintered at a temperature higher than or equal to the eutectic temperature, the first conductive metal, the second conductive metal, a eutectic alloy thereof, or a combination thereof is liquified, thereby wetting the surface of the capacitor body. Subsequently, the paste for forming the first layer is cooled with an interface oxidation reaction, forming the first layer. Through this process, the alloy portion is formed where to meet the dielectric layer, the diffusion portion is formed where to meet the internal electrode, and an outer layer is collectively formed on the outside of the alloy portion.

In addition, through the interface oxidation reaction, an oxide of the second conductive metal may be generated mainly where to meet the dielectric layer. For this purpose, the sintering may be performed under an air atmosphere and an atmospheric pressure to supply oxygen.

Optionally, on the outer surface of the obtained capacitor body, a paste for forming a second layer is coated and cured to form the second layer.

The paste for forming the second layer may include a resin and optionally, a conductive metal or a non-conductive filler. The conductive metal and the resin are the same as described above and will not be repeated illustrated again. In addition, the paste for forming the second layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the second layer may include dipping the capacitor body 110 into the paste for forming the second layer to form the second layer and curing it, screen-printing or gravure-printing the paste for forming the second layer on the surface of the capacitor body 110, or coating the paste for forming the second layer on the surface of the capacitor body 110 and then curing it.

Subsequently, a third layer is formed outside the first layer or the second layer.

For example, the third layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto.

Preparation Examples: Manufacturing of Multilayered Capacitor

Example 1

A paste including barium titanite ($BaTiO_3$) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Subsequently, a conductive paste including copper (Cu) and silver (Ag) as conductive metals (including 20 parts by weight of silver based on 100 parts by weight of copper) is dip-coated to the outer surface of the capacitor body and then, dried. The capacitor body coated with the conductive paste is maintained at a eutectic temperature of copper (Cu) and silver (Ag), 780° C. to 800° C., for 60 minutes to 120 minutes, forming a first layer.

In addition, on the first layer, a nickel (Ni) plating electrode layer is formed, manufacturing a multilayered capacitor.

Figure 5:
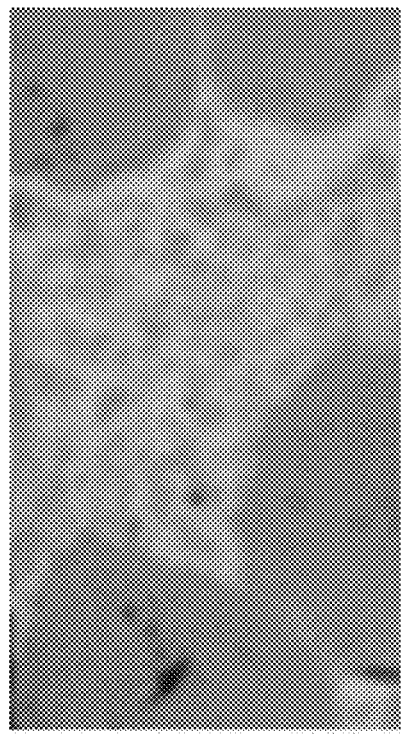
FIG. 5 is a scanning electron microscope (SEM) photograph of the alloy portion of the multilayered capacitor manufactured in Example 1.

FIG. 5 is a scanning electron microscope (SEM) photograph of the alloy portion of the multilayered capacitor manufactured in Example 1. Referring to FIG. 5, in the alloy portion, formed is a eutectic alloy in which copper (Cu) is mixed in a lamellar structure inside silver (Ag).

Comparative Example 1

A paste including barium titanite ($BaTiO_3$) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Subsequently, a conductive paste including a glass frit and copper (Cu) as a conductive metal is dip-coated on the outer surface of the capacitor body and dried. The capacitor body coated with the conductive paste is maintained at 730° C. for 0.5 hour to form a first layer.

In addition, on the first layer, a nickel (Ni) plating electrode layer is formed, manufacturing a multilayered capacitor.

Experimental Example: High-Temperature Reliability of Multilayered Capacitor

Each multilayered capacitor of Example 1 and Comparative Example 1 is manufactured by 720 and then tested with respect to initial high-temperature load reliability, and the results are shown in Table 1.

The initial high-temperature load reliability (HALT) test is performed by mounting each multilayered capacitor by 6 on a jig capable of mounting 40 channels and preparing 3 jigs for each condition. A substrate is put in a HALT equipment and then measured with respect to high-temperature reliability in an environment of 150° C. and 1.75 Vr for 20 hours, and then the number of multilayered capacitors in which IR are immeasurable due to defects is counted.

TABLE 1

| High-temperature load for 20 hours | Comparative Example 1 | Example 1 |
|---|---|---|
| Number of failures | 120/720 | 78/720 |
| Failure rate (%) | 16.67 | 10.83 |

Referring to Table 1, the multilayered capacitor of Example 1 exhibits 35% improved initial failure rate, compared with the multilayered capacitor of Comparative Example 1.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
112, 113: cover region
121: first internal electrode
122: second internal electrode
131: first external electrode
132: second external electrode
1311, 1321: first layer
1311a, 1321a: inner layer
1321a1: alloy portion
1321a11: first portion
1321a12: second portion
1321a2: diffusion portion
1311b, 1321b: outer layer
1321b1: first conductive metal
1321b2: second conductive metal
1313, 1323: third layer

What is claimed is:

1. A multilayered capacitor, comprising:
a capacitor body including a dielectric layer and an internal electrode; and
an external electrode outside the capacitor body,
wherein the external electrode includes a first layer disposed outside the capacitor body, the first layer including a first conductive metal, a second conductive metal, and an alloy thereof,
the first layer includes an inner layer comprising:
an alloy portion disposed at a portion meeting the dielectric layer and including the alloy of the first conductive metal and the second conductive metal; and
a diffusion portion disposed at a portion meeting the internal electrode, the diffusion portion including the first conductive metal, a third conductive metal included in the internal electrode, an alloy thereof, or a combination thereof,
the alloy of the first conductive metal and the second conductive metal is a eutectic alloy, and
the eutectic alloy is a mixture of the first conductive metal and the second conductive metal in a lamellar structure, a rod-like structure, a globular structure, or an acicular structure.

2. The multilayered capacitor of claim 1, wherein
the first layer is composed of the first conductive metal, the second conductive metal, and a eutectic alloy thereof.

3. The multilayered capacitor of claim 2, wherein
the first layer does not include a glass component.

4. The multilayered capacitor of claim 1, wherein
the alloy portion and the diffusion portion are alternately disposed along a stacking direction of the dielectric layer and the internal electrode.

5. The multilayered capacitor of claim 4, wherein
the alloy portion extends along a width direction of the dielectric layer, and
the diffusion portion extends along a width direction of the internal electrode.

6. The multilayered capacitor of claim 4, wherein
the alloy portion has
a plurality of first portions that contact the dielectric layer and extend along a width direction of the dielectric layer, and
a second portion disposed outside the plurality of first portions and extending along the stacking direction to connect the plurality of first portions to each other.

7. The multilayered capacitor of claim 6, wherein
the diffusion portion is disposed between the plurality of first portions of the alloy portion.

8. The multilayered capacitor of claim 1, wherein
the first layer further includes an outer layer disposed outside the inner layer and including the first conductive metal and the second conductive metal.

9. The multilayered capacitor of claim 8, wherein
the outer layer includes the first conductive metal as a main component, and
the second conductive metal is dispersed in the first conductive metal.

10. The multilayered capacitor of claim 8, wherein
the external electrode further includes a third layer disposed outside the first layer and including a plated metal, and
the outer layer of the first layer is in contact with the third layer.

11. A multilayered capacitor, comprising:
a capacitor body including a dielectric layer and an internal electrode; and
an external electrode outside the capacitor body,
wherein the external electrode includes a first layer disposed outside the capacitor body, the first layer including a first conductive metal, a second conductive metal, and an alloy thereof,
the first layer includes an inner layer comprising:
an alloy portion disposed at a portion meeting the dielectric layer and including the alloy of the first conductive metal and the second conductive metal; and
a diffusion portion disposed at a portion meeting the internal electrode, the diffusion portion including the first conductive metal, a third conductive metal included in the internal electrode, an alloy thereof, or a combination thereof,
the first conductive metal is copper (Cu),
the second conductive metal is silver (Ag), and
the third conductive metal is nickel (Ni).

12. A multilayered capacitor, comprising:

a capacitor body including a dielectric layer and an internal electrode; and an external electrode outside the capacitor body, wherein the external electrode includes a first layer disposed outside the capacitor body, the first layer including a first conductive metal, a second conductive metal, and an alloy thereof, the first layer includes an inner layer comprising:

an alloy portion disposed at a portion meeting the dielectric layer and including the alloy of the first conductive metal and the second conductive metal; and a diffusion portion disposed at a portion meeting the internal electrode, the diffusion portion including the first conductive metal, a third conductive metal included in the internal electrode, an alloy thereof, or a combination thereof, the alloy portion further includes an oxide of the second conductive metal.

13. The multilayered capacitor of claim 12, wherein the oxide of the second conductive metal is silver oxide ($AgO_x$).

14. The multilayered capacitor of claim 12, wherein the oxide of the second conductive metal in the alloy portion is mainly disposed in a portion in contact with the dielectric layer.

15. A method of manufacturing a multilayered capacitor, comprising manufacturing a capacitor body including a dielectric layer and an internal electrode, and forming an external electrode outside the capacitor body, wherein the forming of the external electrode includes forming a first layer by sintering a paste for forming a first layer including a first conductive metal and a second conductive metal at a temperature higher than or equal to a eutectic temperature of the first conductive metal and the second conductive metal.

16. The method of claim 15, wherein the first conductive metal is copper (Cu), the second conductive metal is silver (Ag), and the eutectic temperature is about 760° C. to about 800° C.

17. The method of claim 15, wherein the paste for forming the first layer includes about 10 parts by weight to about 100 parts by weight of the second conductive metal based on 100 parts by weight of the first conductive metal.

18. The method of claim 15, wherein in the forming of the first layer, in the sintering of the paste for forming the first layer at the temperature higher than or equal to the eutectic temperature, the first conductive metal, the second conductive metal, a eutectic alloy thereof, or a combination thereof is liquefied, wets a surface of the capacitor body, and then is cooled along with an interface oxidation reaction to form the first layer.

* * * * *